US011810070B2

(12) United States Patent
Freed et al.

(10) Patent No.: US 11,810,070 B2
(45) Date of Patent: Nov. 7, 2023

(54) CLASSIFYING DIGITAL DOCUMENTS IN MULTI-DOCUMENT TRANSACTIONS BASED ON EMBEDDED DATES

(71) Applicant: INTERNATIONAL BUSINESS MACHINES CORPORATION, Armonk, NY (US)

(72) Inventors: Andrew R. Freed, Cary, NC (US); Corville O. Allen, Morrisville, NC (US)

(73) Assignee: International Business Machines Corporation, Armonk, NY (US)

(*) Notice: Subject to any disclaimer, the term of this patent is extended or adjusted under 35 U.S.C. 154(b) by 335 days.

(21) Appl. No.: 17/199,700

(22) Filed: Mar. 12, 2021

(65) Prior Publication Data
US 2021/0201016 A1   Jul. 1, 2021

Related U.S. Application Data

(63) Continuation of application No. 16/024,891, filed on Jul. 1, 2018, now Pat. No. 11,017,221.

(51) Int. Cl.
*G06Q 10/10* (2023.01)
*G06V 30/413* (2022.01)
*G06V 30/416* (2022.01)
*G06V 30/414* (2022.01)

(52) U.S. Cl.
CPC .......... *G06Q 10/10* (2013.01); *G06V 30/413* (2022.01); *G06V 30/414* (2022.01); *G06V 30/416* (2022.01)

(58) Field of Classification Search
CPC ... G06K 9/2054; G06K 9/2063; G06K 9/2072
USPC ......... 382/173–180, 182, 187, 100–101, 321
See application file for complete search history.

(56) References Cited

U.S. PATENT DOCUMENTS

| | | | |
|---|---|---|---|
| 6,094,653 A | * | 7/2000 | Li .................. G06F 16/355 707/999.005 |
| 6,442,555 B1 | | 8/2002 | Shmueli et al. |
| 7,346,839 B2 | | 3/2008 | Acharya et al. |
| 7,840,572 B2 | | 11/2010 | Cutts et al. |

(Continued)

FOREIGN PATENT DOCUMENTS

WO      2015125088      8/2015

OTHER PUBLICATIONS

Startseva, Arina, et al. "Analysis of Financial Payments Text Labels in the Dynamic Client Profile Construction." 2020 International Conference on Information Technology and Nanotechnology (ITNT). IEEE, 2020. (Year: 2020).*

(Continued)

*Primary Examiner* — Andrae S Allison
(74) *Attorney, Agent, or Firm* — David K. Mattheis

(57) ABSTRACT

A generator categorizes documents in one or more transactions into buckets, each identified by a separate category for an expected time window based on a separate relative age of each of the documents evaluated from one or more dates identified in the documents. The generator trains a document classifier with a model of the separate relative age of each of the documents as a temporal characteristic correlated with the respective category of a respective bucket of the buckets. The document classifier executes on a input documents to classify each of the input documents as a particular logical type identified by a particular category from among multiple logical types.

20 Claims, 8 Drawing Sheets

(56) References Cited

U.S. PATENT DOCUMENTS

| | | | |
|---|---|---|---|
| 7,917,492 B2 | 3/2011 | Bargeron et al. | |
| 8,650,038 B2 | 2/2014 | Peirson et al. | |
| 9,171,070 B2 | 10/2015 | Alspector et al. | |
| 9,542,374 B1 | 1/2017 | Barr et al. | |
| 9,575,622 B1 | 2/2017 | Allison et al. | |
| 9,626,653 B2 | 4/2017 | Saxena et al. | |
| 9,710,540 B2 | 7/2017 | Lu et al. | |
| 9,842,201 B2 | 12/2017 | Follis et al. | |
| 9,853,818 B2 | 12/2017 | Oswalt | |
| 10,318,804 B2 * | 6/2019 | Powell | G06F 18/251 |
| 11,017,221 B2 * | 5/2021 | Freed | G06Q 10/10 |
| 11,030,446 B2 * | 6/2021 | Yanamandra | G06V 30/413 |
| 2005/0033978 A1 * | 2/2005 | Hyser | G06F 21/577 726/26 |
| 2005/0071741 A1 * | 3/2005 | Acharya | G06Q 30/0246 715/208 |
| 2006/0149643 A1 | 7/2006 | Reiner et al. | |
| 2007/0118391 A1 | 5/2007 | Malaney et al. | |
| 2009/0183007 A1 | 7/2009 | Lim et al. | |
| 2013/0227604 A1 | 8/2013 | Shields et al. | |
| 2014/0032912 A1 | 1/2014 | Hardy et al. | |
| 2014/0143018 A1 | 5/2014 | Nies et al. | |
| 2014/0220526 A1 | 8/2014 | Sylves | |
| 2014/0280061 A1 | 9/2014 | Elkhou et al. | |
| 2016/0026962 A1 | 1/2016 | Shankar et al. | |
| 2017/0033933 A1 | 2/2017 | Haber et al. | |
| 2017/0060846 A1 | 3/2017 | Allen et al. | |
| 2017/0180133 A1 | 6/2017 | Kumar et al. | |
| 2017/0200244 A1 | 7/2017 | Aggarwal et al. | |
| 2017/0228386 A1 * | 8/2017 | Cantley | G06V 30/416 |
| 2020/0005032 A1 * | 1/2020 | Freed | G06V 30/413 |
| 2020/0125827 A1 | 4/2020 | Freed et al. | |
| 2020/0394396 A1 * | 12/2020 | Yanamandra | G06V 30/416 |
| 2021/0158015 A1 * | 5/2021 | Freed | G06F 40/295 |
| 2022/0004756 A1 * | 1/2022 | Jennings | G06Q 20/389 |

OTHER PUBLICATIONS

Shahandashti et al.; "Threshold Attributte-Based Signatures And Their Applications To Anonymous Credential Systems", Progress in Cryptology—AFRICACRYPT 2009, Apr. 2, 2009, pp. 198-216, 32 pages.

Bringer et al.; "Efficient And Strongly Secure Dynamic Domain-Specific Pseudonymous Signatures For ID Documents", Financial Cryptography and Data Security, 2014, pp. 255-272, 17 pages.

Geva et al.; "TOPSIG: Topology Preserving Document Signatures", Proceedings of the 20th ACM international conference on Information and knowledge management, 2011, pp. 333-338, 12 pages.

Werlang et al.; "Electronic Documents With Signature Constraints", available via the Internet from https://sbseg2011.redes.unb.br/resources/downloads/wgid/94370.pdf as of Oct. 18, 2018, 8 pages.

Daniel Isemann, Tim Fernando, and Khurshid Ahmad, "Time Dependent Information and Ontological Analysis," Nov. 2012, retrieved from Internet <https://www.researchgate.net/profile/Khurshid_Ahmad/publication/260590076_Time_Dependent_Information_and_Ontological_Analysis/data/0f317531a07b48be58000000/Report-81-Time-Dependent-Information-and-Ontological-Analysis.pdf>, 10 pages.

Non-final Office Action, dated Apr. 13, 2020, U.S. Appl. No. 16/024,891, filed Jul. 1, 2018, In re Freed, 9 pages.

Final Office Action, dated Sep. 11, 2020, U.S. Appl. No. 16/024,891, filed Jul. 1, 2018, In re Freed, 14 pages.

Notice of Allowance, dated Oct. 28, 2020, U.S. Appl. No. 16/024,891, filed Jul. 1, 2018, In re Freed, 8 pages.

Notice of Allowance, dated Jan. 22, 2021, U.S. Appl. No. 16/024,891, filed Jul. 1, 2018, In re Freed, 9 pages.

Notice of Allowance, dated Nov. 25, 2020, U.S. Appl. No. 16/167,500, filed Oct. 22, 2018, In re Freed, 12 pages.

Non-final Office Action, dated Jun. 25, 2020, U.S. Appl. No. 16/167,500, filed Oct. 22, 2018, In re Freed, 13 pages.

Notice of Allowance, dated Jan. 6, 2021, U.S. Appl. No. 16/167,500, filed Oct. 22, 2018, In re Freed, 9 pages.

"List of IBM Patents or Patent Applications Treated as Related", dated Mar. 15, 2020, 2 pages.

U.S. Appl. No. 17/166,359, filed Feb. 3, 2021, In Re Freed, 47 pages.

* cited by examiner

US 11,810,070 B2

CLASSIFYING DIGITAL DOCUMENTS IN MULTI-DOCUMENT TRANSACTIONS BASED ON EMBEDDED DATES

CROSS REFERENCE TO RELATED APPLICATIONS

This application is a continuation of commonly assigned U.S. patent application Ser. No. 16/024,891, filed Jul. 1, 2018, which is hereby incorporated herein by reference.

BACKGROUND

1. Technical Field

This invention relates in general to computing systems and more particularly to classifying digital documents in multi-document transactions based on embedded dates in the content of the documents.

2. Description of the Related Art

To assist an auditor in performing an audit, copies of signed documents in a multi-document transaction are digitized by scanning an image of each document and storing the scanned image of each document, so that auditors review the digital, scanned image of each document in a multi-document transaction.

BRIEF SUMMARY

In one embodiment, a method is directed to categorizing, by a computer system, a plurality of documents in one or more transactions into a plurality of buckets each identified by a separate category of a plurality of categories for an expected time window based on a separate relative age of each of the plurality of documents evaluated from one or more dates identified in the plurality of documents. The method is directed to training, by the computer system, a document classifier with a model of the separate relative age of each of the plurality of documents as a temporal characteristic correlated with the respective category of a respective bucket of the plurality of buckets. The method is directed to executing, by the computer system, the document classifier on a plurality of input documents to classify each of the plurality of input documents as a particular logical type identified by a particular category from among a plurality of logical types.

In another embodiment, a computer system comprises one or more processors, one or more computer-readable memories, one or more computer-readable storage devices, and program instructions, stored on at least one of the one or more storage devices for execution by at least one of the one or more processors via at least one of the one or more memories. The stored program instructions comprise program instructions to categorize a plurality of documents in one or more transactions into a plurality of buckets each identified by a separate category of a plurality of categories for an expected time window based on a separate relative age of each of the plurality of documents evaluated from one or more dates identified in the plurality of documents. The stored program instruction comprise program instructions to train a document classifier with a model of the separate relative age of each of the plurality of documents as a temporal characteristic correlated with the respective category of a respective bucket of the plurality of buckets. The program instructions comprise program instructions to execute the document classifier on a plurality of input documents to classify each of the plurality of input documents as a particular logical type identified by a particular category from among a plurality of logical types.

In another embodiment, a computer program product comprises a computer readable storage medium having program instructions embodied therewith, wherein the computer readable storage medium is not a transitory signal per se. The program instructions are executable by a computer to cause the computer to receive, by the computer, a document. The program instructions are executable by a computer to cause the computer to categorize, by the computer, a plurality of documents in one or more transactions into a plurality of buckets each identified by a separate category of a plurality of categories for an expected time window based on a separate relative age of each of the plurality of documents evaluated from one or more dates identified in the plurality of documents. The program instructions are executable by a computer to cause the computer to train, by the computer, a document classifier with a model of the separate relative age of each of the plurality of documents as a temporal characteristic correlated with the respective category of a respective bucket of the plurality of buckets. The program instructions are executable by a computer to cause the computer to execute, by the computer, the document classifier on a plurality of input documents to classify each of the plurality of input documents as a particular logical type identified by a particular category from among a plurality of logical types.

BRIEF DESCRIPTION OF THE SEVERAL VIEWS OF THE DRAWINGS

The novel features believed characteristic of one or more embodiments of the invention are set forth in the appended claims. The one or more embodiments of the invention itself however, will best be understood by reference to the following detailed description of an illustrative embodiment when read in conjunction with the accompanying drawings, wherein:

DETAILED DESCRIPTION

In the following description, for the purposes of explanation, numerous specific details are set forth to provide a thorough understanding of the present invention. It will be apparent, however, to one skilled in the art that the present invention may be practiced without these specific details. In other instances, well-known structures and devices are shown in block diagram form to avoid unnecessarily obscuring the present invention.

In addition, in the following description, for purposes of explanation, numerous systems are described. It is important to note, and it will be apparent to one skilled in the art, that the present invention may execute in a variety of systems, including a variety of computer systems and electronic devices operating any number of different types of operating systems.

Figure 1:
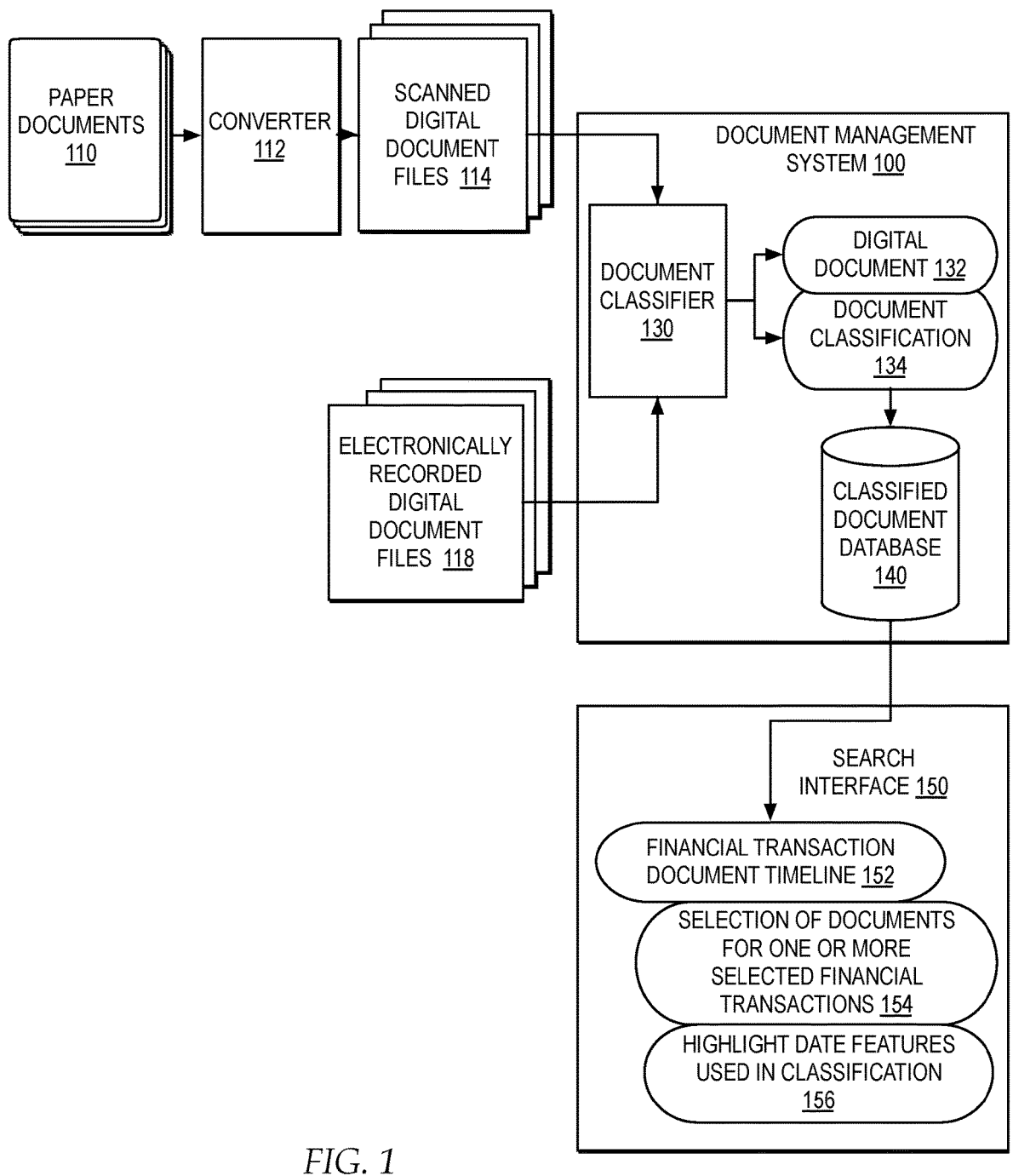
FIG. 1 is a block diagram illustrating one example of a system for classifying documents of a multi-document transaction in a document management system based on embedded dates within the content of the documents.

FIG. 1 illustrates a block diagram of one example of a system for classifying documents of a multi-document transaction in a document management system based on embedded dates within the content of the documents.

In one or more business contexts, multiple documents are executed or recorded at different times as a part of a transaction or other type of workflow that occurs over a period of time. For example, business contexts may include, but are not limited to, financial transactions, insurance transactions, and legal workflows. Each type of transaction has an associated timeline of relative durations or time windows expected for responses between one or more types of documents typical in the type of transaction. The timeline of relative durations or time windows expected for responses is determined by one or more sets of rules such as, but not limited to, financial rules and regulatory rules. One or more of the documents in a transaction are dated within the content of the document, such as on the face of the document, to indicate relative temporal order of each document within the sequence of documents of the transaction over a period of time. In addition, one or more documents in a transaction may include no date within the content of the document itself.

For example, for a financial transaction, such as a loan, the types of documents that accompany the loan over a period of time may include, but are not limited to, originating documents, a primary note, an appraisal document, financial statements, and additional documents. In one example, one or more of the documents added as part of a financial transaction are confirmed by one or more participants to the financial transaction through a signature on the face of a paper version of a document or a digital signature on an electronic version of a document. In one example, a loan may be supported by hundreds or thousands of pages of documentation. In addition, many documents added as part of a financial transaction include one or more dates, from one or more signers indicating the ordered, temporal position of the document in the sequence of documents of a financial transaction over a period of time. In addition, many documents added as part of a financial transaction include one or more documents added within time windows that are predictable based on the expected timeline for documents, such as one type of document in the loan expected to be filed within 30 days of another type of document in the loan.

For example, for an insurance transaction, the types of documents that accompany the insurance transaction over a period of time may include, but are not limited to, an insurance application, inspection reports, claims, claims reports, and payment confirmations. In one example, inspection reports and claims reports are expected to occur within predictable time windows relative to the date of the insurance application, within the sequence of documents of an insurance transactions, such as occurring annually, however claims documents are unpredictable and may occur at any time.

For example, for a legal transaction, the types of documents that accompany the type of legal transaction over a period of time may include a sequence of documents that follow one or more of federal, state, and local rules regarding types of filing documents and timelines for response. The type of transaction and rules in place for the transaction, determine the types of documents typical for the transaction and the relative predictable time windows for certain types of documents based on deadlines for response in the rules.

In an embodiment of the invention, in one example, a reviewer, such as but not limited to, an auditor, reviews the documents from a transaction for one or more purposes. In one example, to aid a reviewer in reviewing the documents recorded as part of a transaction, documents are stored for review in a digital format in a document management system 100. The party reviewing the documents then accesses the documents in the digital format from document management system 100.

In one example, many documents associated with a transaction are originally recorded on paper, such as paper documents 110, but are stored in a classified document database 140 of document management system 100 in a digital format. In one example, to store paper documents in a digital format, a converter 112 captures an image of paper documents 110 and applies one or more types of readers to electronically convert an image of a typed, handwritten, or printed text into machine-encoded text in scanned digital document files 114. In one example, the types of readers applied by converter 112 to electronically convert an image of paper documents 110 into machine-encoded text include, but are not limited to, an optical character recognition (OCR) reader, an optical word recognition reader, an intelligent character recognition (ICR) reader, and an intelligent word recognition (IWR) reader. In one example, converter 112 captures an image of paper documents 110 through one or more image capturing devices including, but not limited to, a scanner, a camera, and an imaging controller. In one example, converter 112 identifies both text and images, where the images are not readily convertible into text.

In an embodiment of the invention, different individual transactions of a same type include similar predictable sequences of logical types of documents and similar predictable relative timelines within the sequence of logical types of documents, however the content or layout of the documents of a same logical type may vary across different providers and across different individual transactions. While some documents that are part of a transaction may include a textual label on the face of the document itself that matches the logical type of the document, such as a document falling under the logical type of "promissory note" with a textual heading within the text of the document itself of "promissory note", many documents that are part of a transaction do not include a textual label identifying or matching the logical type of the document on the face of the document. As a result, while converter 112 scans an image of paper documents 110 and converts the scanned image to text that can be read and analyzed, converter 112 does not automatically identify the logical type of each of paper documents 110 converted into scanned digital document files 114 from reading the converted text of the document. In addition, in one example, document management system 100 receives electronically recorded digital document files 118, such as an electronically signed digital document, that do not include a textual label matching a logical type of electronically recorded digital document files 118 and do not include a file name, metadata, or a file system attribute that identifies a logical type of document.

In an embodiment of the invention, to facilitate review of documents of a transaction, document management system 100 implements a document classifier 130 to automatically classify each digital document file received for a transaction into one or more categories, each associated with a different logical type of document in a transaction. As illustrated, document classifier 130 receives scanned digital document files 114 that include at least a selection of documents of unknown logical type and receives electronically recorded digital document files 118 that include at least a selection of documents of unknown logical type. Document classifier 130 determines, for each digital document file received, a digital document 132 and a document classification 134 identifying at least one category associated with a logical type from among multiple logical types of files. Document management system 100 stores each digital document 132 with identified document classification 134 in classified document database 140.

In an embodiment of the invention, document classifier 130 applies a date-based classification system that is trained to identify a category associated with a logical type for each document by scanning for dates embedded in the content of digital documents and logically categorizing types of documents using the identified dates based on the temporal characteristics of each logical type of document in a transaction. In particular, document classifier 130 applies a date-based classification system that determines a category of a document based on the relative age and context of positions of dates identified in the content of a document within a group of documents of a transaction. For example, in a particular type of financial transaction, the date identifying a relative age of a document temporally within expected time windows of a transaction and context of proximate to the position of one or more dates within a document indicates, with a high probability, the logical type of document within the sequential timeline of documents of the particular type of financial transaction. Document classifier 130 is trained by a classification model to assign a category to a document from scanned dates based on the relative age of a document temporally within expected time windows of a transaction timeline and context of the positions of the dates identified, or not identified, in the content of a document. In one example, if document classifier 130 determines no date is identified embedded in the content of a document, in one example, document classifier 130 classifies the document as not relevant for a date-based classification and applies other types of classification analysis.

In document classification 134, document classifier 130 identifies a logical type of document based on the category and one or more dates applied for classifying the document. In one example, document classification 134 represents metadata added to digital document 132. In another example, document classification 134 is stored as classification data in a database entry for digital document 132 or in a separate file or file system attribute stored in classified document database 140 in association with digital document 132.

In one example, an advantage of storing each document in classified document database 140 with a separate logical type based on a date-based classification category is that the documents in classified document database 140 are searchable by logical type, such that an auditor or other party may more quickly sort and review selections from among large volumes of digital document files in classified document database 140, according to logical type. In one example, a search interface 150 accessing a selection of documents for one or more selected financial transactions 154 from classified document database 140 for one or more financial transactions sorts the documents into a financial transaction document timeline 152 of digital images of the documents ordered according to logical types determined from date-based classifications. In one example, an advantage of identifying documents by logical types is that an auditor or other party reviewing hundreds or thousands of documents in a single transaction is enabled to quickly access only those documents of a particular logical type that are relevant to an audit on financial transaction document timeline 152.

In one example, an advantage of classifying financial transaction documents based on logical types determined from date-based classifications performed by document classifier 130 is that the probability of accurately classifying a document is increased by performing date-based classifications based on the sequential probability of expected time windows between recordings of certain logical types of documents and the probability that the predictability of the context of the position of dates of certain logical types of documents. As the probability of accurately classifying a document increases, the need for human intervention to re-train document classifier 130 or to correct incorrect classifications by document classifier 130, decreases.

In an embodiment of the present invention, document management system 100 also includes additional classifiers or document classifier 130 trained to perform classifications based on types of data in addition to date base classifications, such as a classifier trained to classify a document based on the frequency that one or more words appear in the text of the document, such as word clusters. Identifying the frequency of a word in a document alone provides some context for classifying a document, however for some types of transactions, the same words may appear at similar frequencies across different logical types of documents or multiple logical types of documents may occur at a same date but with different word frequency attributes, such that by combining both dates-based classification with word frequency classification, the probability of a correct classification of a document increases.

In an embodiment of the present invention, document management system 100 also includes additional analyzers for determining categories of documents through an analyzer that extracts specific locations of a document and versions of documents based on knowledge objects and relationships to identify the category of document. In one example, if document management system 100 only manages documents received for a same type of financial transaction originating from a single financial provider where the financial provider uses a same form for each financial transaction, extracting a specific location within the document where a particular label is expected to always appear to identify a category of document may increase the efficiency of categorizing documents, however, if document management system 100 manages documents originating from different providers not all using the same form, date-based classification allows document management system 100 to efficiently categorize multiple documents from a same type of transaction that do not follow a form where a particular label occurs in a same location in each form.

In an embodiment illustrated in FIG. 1, in outputting the selected documents, search interface 150 highlights the output of the embedded dates of the selected documents used in the date-based document classifications as illustrated at reference numeral 156. In one example, the types of highlights of the date features include, but are not limited to, graphical, tactile, and audio characteristics distinguishing dates used in documents for classification from other text and images within a document within the output interface.

Figure 2:
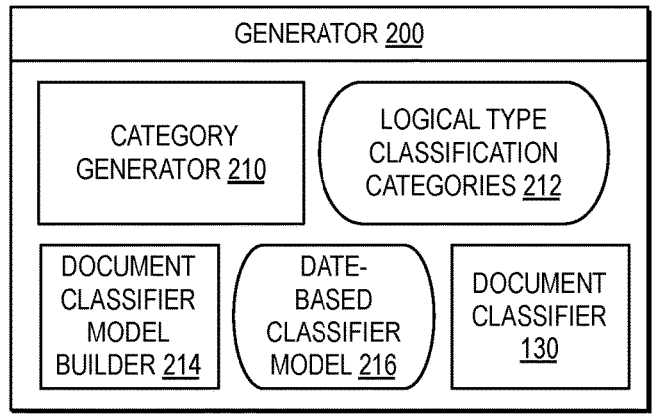
FIG. 2 illustrates a block diagram of one example of a document classifier generator for performing date-based classification of digital documents.

FIG. 2 illustrates a block diagram of one example of a document classifier generator for performing date-based classification of digital documents.

In one embodiment of the invention, a generator 200 includes a category generator 210 for selecting multiple logical type classification categories 212. In one example, category generator 210 prompts a user to selectively enter classification categories or select from among a list of classification categories for identification with a particular type of transaction. In one example, category generator 210 automatically create a selection of document classification categories in logical type classification categories 212 from an analysis of a selection of documents for a particular transaction type that are already labeled according to type.

In one embodiment of the invention, category generator 210 also identifies, for each type of document to classify under each of the categories in logical type classification categories 212, one or more characteristics of the type and position of dates within the content of the documents. In one example, a user selectively identifies key embedded dates and context elements relative to the key dates within the content of a document. In one example, category generator 210 uses standard text extraction of each document to identify key dates in the document or identify a lack of dates. In one example, category generator 210 determines, for each date identified, one or more context elements for the position of the date in the content of the document including, but not limited to, a page number or relative page position at the start or end of the document containing the date, a section header label relative to the date, whether the date is proximate to a signature or signature block, the roles of signers to a signature block, the relation of table of headers to the position of the date, and whether there are co-referenced dates in the document, such as multiple dates entered by a same period or inter-dependent people, such as an applicant and a reviewer.

In one embodiment of the invention, category generator 210 determines the expected time windows of one type of logical document on a timeline or compared to other logical types of documents for a same transaction based on expected dates for documents, expected duration between dates of certain types of documents, deadlines between types of documents, time periods provided for responses between logical types of documents, and other time-dependent rules of the predicted sequential timeline for a particular type of transaction. In one example, a user specifies a selection of rules for the predicted sequential timeline of different types of documents for a particular transaction and category generator 210 automatically determines the predictable time windows for different logical types of documents based on the selection of rules. In one example, category generator 210 analyzes the sequence of relative ages of documents for multiple transactions of a same type to identify expected time windows for receiving documents relative to a date on a particular logical type of document, such as an earlier date on logical type of document of an originating document.

In one embodiment, category generator 210 updates logical type classification categories 212 with buckets of one or more types of documents associated with each classification category based on the relative age and document dates associated with the document, along with identifying the context for the positions of the dates in association with each classification category.

In one example, a document classifier 130 builds a date-based classifier model 216 based on logical type classification categories 212. In one example, document classifier 130 represents any classifier, such as, but not limited to, a bag-of-words classifier, and date-based classifier model 216 represents a model applicable for the type of classifier, such as, but not limited to, a bag-of-words model, with date-related features of logical type classification categories 212 appended. In one example, a bag-of-words model is a representation also known as a vector space model, used in natural language processing and information retrieval (IR), where text is represented as a bag, or multiset, of its words, disregarding grammar and word order, but maintaining multiplicity. In one example, a bag-of-words model is used in document classification where the frequency of occurrence of each word is used as a feature for training the classifier. In the example, document classifier 130 generates date-based classifier model 216 to classify words and phrases scanned from the content of a document and appends date-related features from logical type classification categories 212 to classify dates scanned from the content of the document.

In one example, document classifier 130 is trained with date-based classifier model 216 and outputs logical type labels for each classification category. In one example, by training document classifier 130 with date-based classification categories, for financial transaction documents or other documents with logical types that are identifiable by predictable relative dates on a timeline and context proximate to dates, document classifier 130 automatically, efficiently classifies digital documents with a high probability of accuracy.

Figure 3:
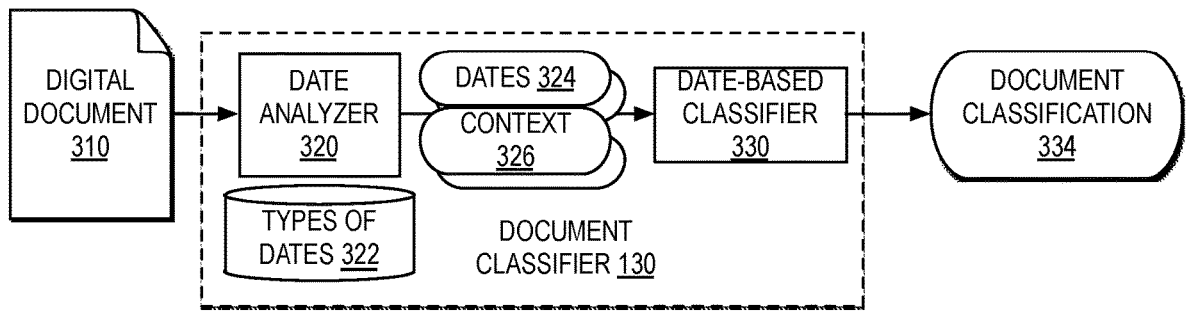
FIG. 3 illustrates a block diagram of an example of a document classifier for date-based categorization of a document according to logical type as part of a multi-document transaction.

FIG. 3 illustrates a block diagram of an example of a document classifier for date-based categorization of a document according to logical type as part of a multi-document transaction.

In an embodiment of the invention, document classifier 130 receives a digital document 310, where digital document 310 represents a document file from among scanned digital document files 114 or electronically recorded digital document files 118. Digital document 310 includes one or more pages.

In one embodiment, a date analyzer 320 of document classifier 130 scans each page of digital document 310 to identify and extract one or more key embedded dates according to one or more rules in types of dates 322 and outputs the extracted dates as dates 324. In one example, rules in types of dates 322 specifies rules for identifying dates in different formats, such as, but not limited to, different numerical formats of "month/day/year", "year/month/day", "year"-"mm"-"dd" and different word formats such as the name of a month, numerical date, and numerical year.

In addition, in one embodiment, date analyzer 320 also identifies one or more context elements proximate to dates 324 within digital document 310 and outputs the associated context elements as context 326 with each date in dates 324.

In one example, context 326 includes, but is not limited to, positions proximate to other dates in the document, positions proximate to page numbers, positions proximate to section headers, positions proximate to signature blocks, positions proximate to selected signer roles, positions proximate to co-referenced dates, positions proximate to a start of a document, positions proximate to the end of a document, positions proximate to table headers, and positions proximate to document style elements.

According to another aspect, in identifying context 326, date analyzer 320 scans areas surrounding an image in a document and the content around the image to identify whether the image is a signature block in context 326. In one example, date analyzer 320 determines that the content around an image includes words or keywords indicating "date" and identifies the image as a signature block in context 326. In another example, date analyzer 320 determines that the content around a signature incudes a next line or subsequent line with a name and identifies the image as a signature block in context 326. In another example, date analyzer 320 detects an image identifiable as a digital signature and identifies the digital signature as a signature block in context 326.

According to another aspect, in identifying context 326, date analyzer 320 analyzes the locations and structures of dates 324 to determine a type of date for the type of location and proximate elements. In one example, date analyzer 320 applies additional heuristics applicable for date signing requirements according to regulatory or financial rules for a transaction to determine the nature of dates 324 and context 326.

According to another aspect, in identifying context 326, date analyzer 320 evaluates the position of dates 324 within the document by page location, section, and area. In one example, date analyzer 320 identifies a beginning and end of a document, identifying whether each page includes one or more dates within dates 324, whether dates 324 fall under a particular textually labeled or graphically designated section heading or area, and whether multiple dates occur in series. In one example, date analyzer 320 evaluates the positions of dates 324 proximate to page location, section and area to identify context 326 according to regulatory or financial rules for a transaction. In one example, date analyzer 230 builds a contextual prefix to dates 324 where a same line, previous paragraph, and next line of paragraph context are determined and applied to determine context 326.

In one embodiment, a date-based classifier 330, as trained by date-based classifier model 216, selects one or more classification categories for dates 324 and context 326 in view of temporal characteristics of categories of documents in a transaction and outputs a logical type label associated with the selected category, along with dates 324, as document classification 334 for storage in a classified document database 140.

Figure 4:
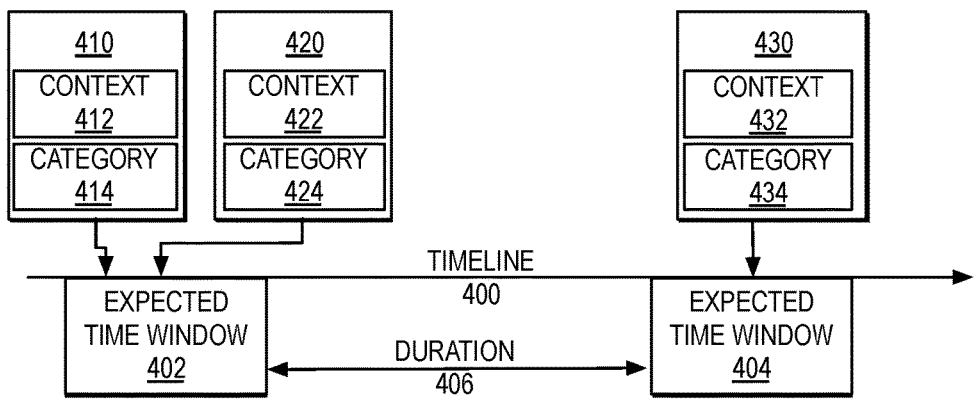
FIG. 4 is a block diagram illustrating an example of an expected timeline for a transaction with temporal characteristics of categories of documents associated with context and relative age of embedded dates.

FIG. 4 is a block diagram illustrating an example of an expected timeline for a transaction with temporal characteristics of categories of documents associated with context and relative age of embedded dates.

In one example, a timeline 400 illustrates an expected timeline of a sequence of different logical types of documents in a transaction used in training document classifier 130 for date-based classifications of documents. In one example, timeline 400 includes one or more expected time windows during which one or more documents are expected to be dated, illustrated as an expected time window 402 and an expected time window 404. In one example, a duration 406 illustrates a predictable duration of time between expected time window 402 and expected time window 404.

In one example, a document 410 includes a context 412 associated with one or more dates embedded in document 410, for a relative age of expected time window 402, assigned a category 414. In addition, in one example, document 410 includes a context 422 associated with one or more dates embedded in document 420, for a relative age of expected time window 402, assigned a category 424. In one example, context 412 and context 422 identify different types of context elements within a document, proximate to dates, and category 414 and category 424 identify a same or different categories from among categories for a transaction, predicted to be dated within a same time window of expected time window 402.

In one example, a document 430 includes a context 432 associated with one or more dates embedded in document 430, for a relative age of expected time window 404, assigned a category 434. In one example, context 422 and category 424 match context 432 and category 434, however the relative age of document 430, as determined by an embedded date in document 430, is within an expected time window that is relatively older than the relative age of document 420, as determined by an embedded date in document 420, by a length of time of at least duration 406.

In one embodiment of the invention, by identifying the date-based context characteristics of different categories of documents in a transaction, in correlation with identifying the expected sequential order of documents and expected duration of time between documents, then a classifier model can be trained to predict when expected time window 402 and expected time window 404 will occur. In one example, expected time window 402 and expected time window 404 represent the initial deadline window for a document, along with a grace period for the document before and after the deadline. In addition, in one embodiment of the invention, as additional documents are added to timeline 400 for a particular type of transaction, timeline 400 may include additional expected time windows of different lengths and overlapping expected time windows.

Figure 5:
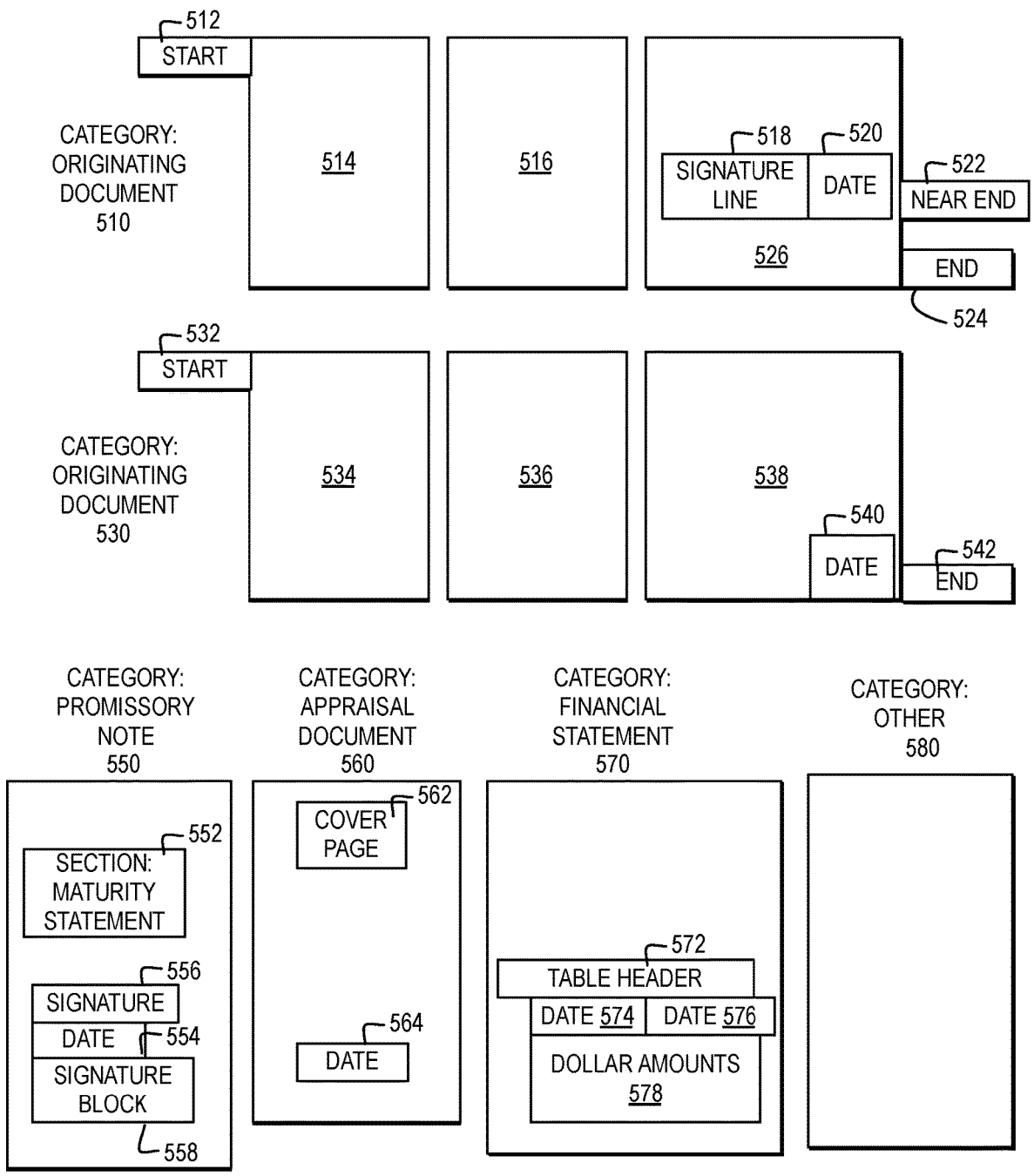
FIG. 5 illustrates a block diagram of one example of context associated with embedded dates for categorizing different logical types of documents in a loan transaction.

FIG. 5 illustrates a block diagram of one example of context associated with embedded dates for categorizing different logical types of documents in a loan transaction.

In one example, a financial transaction for a loan includes one or more originating documents recorded at one or more times. FIG. 5 illustrates an example of different context elements of documents in the financial transaction reflecting temporal characteristics by category applied by date-based classifier 330.

In the example illustrated in FIG. 5, the context model identified for a category of "originating document", as illustrated at reference numeral 510, includes an identifier for a first page 514 illustrated as start 512, which may be identified based on a first page number or other starting page identifier, and identifier for one or more additional pages 516, which may be identified by page numbers or other identifiers as middle pages of an originating document, and an identifier for a last page 526 illustrated as end 524, which may be identified based on a last page number in a sequence or other last page identifier. In addition, as illustrated at reference numeral 510, the context identified for the category of "originating document", as illustrated at reference numeral 510, includes an identifier for a date 520 positioned proximate to a signature line 518 in a relative page position of near end 522 that is closer to end 524 than to start 512.

In one example, the financial transaction for the loan includes additional context models for documents under the category of "originating document", as illustrated at reference numeral 530. In the example illustrated in FIG. 5, the context identified for the category of "originating document", as illustrated at reference numeral 530, includes an identifier for a first page 534 illustrated as start 532, which may be identified based on a first page number or other starting page identifier, and identifier for one or more additional pages 536, which may be identified by page numbers or other identifiers as middle pages of an originating document, and an identifier for a last page 538 illustrated as end 542, which may be identified based on a last page number in a sequence or other last page identifier. In addition, as illustrated at reference numeral 530, the context identified for the category of "originating document", as illustrated at reference numeral 530, includes an identifier for a date 540 positioned in a relative page position of end 542 that is proximate to the end of last page 538.

In one example, a timeline including the context models for the category of "originating document" illustrated at reference numeral 510 and illustrated at reference numeral 530 includes both originating documents associated with one or more of the same expected time windows. In another example, the timeline including the context model for the category of "originating document" illustrated at reference numeral 510 and illustrated at reference numeral 530 includes one or more different time windows for each of the context models.

In one example, the financial transaction for the loan includes a context model for documents under the category of "promissory note", as illustrated at reference numeral 550. In the example illustrated in FIG. 5, the context model identified for the category of "promissory note", as illustrated at reference numeral 550, includes a section identifier 552 of "maturity statement", proximate to a date 554. In one example, the "maturity statement" represents one of multiple statements used to train document classifier 130 prior to a signature block, such as, but not limited to, a statement of "I (we) received a copy of this notice, which is part of my/our credit application". In addition, in the example in FIG. 5, the context model identified for the category of "promissory note", as illustrated at reference numeral 550, includes a signature 556 and a signature block 558 proximate to date 554, following section identifier 552. In one example, signature 556 represents a handwritten or digital signature. In one example, signature block 558 includes a line or other signature indicator and a role of the signor, such as role that indicates "borrower". In one example, the combination of section identifier 552 of "maturity statement" preceding date 554 and date 554 identified proximate to signature 556 and signature block 558, with signature block 558 including a role of "borrower", indicates a higher probability of a correct classification of under the category of "promissory note" than if the section identifier alone were identified, since other documents may include the "maturity statement", but only the promissory note within the transaction includes a date in a signature block with a role of "borrower" following a "maturity statement"

In one example, the financial transaction for the loan includes a context model for documents under the category of "appraisal document", as illustrated at reference numeral 560. In the example illustrated in FIG. 5, the context model identified for the category of "appraisal document", as illustrated at reference numeral 560, is identified as a cover page 562, such as by a textual or graphic label of "cover page", proximate to a date 564 on the same page. In one example the combination of date 564 on a page identified as a "cover page", along with a relative age of the document at the beginning of a transaction, identifies the document is most likely classified under the category of "appraisal document".

In one example, the financial transaction for the loan includes a context model for documents under the category of "financial statement", as illustrated at reference numeral 570. In the example illustrated in FIG. 5, the context model identified for the category of "financial statement", as illustrated at reference numeral 570, is identified as a table header 572, as identified by a textual label or graphic indicator of a financial table, proximate to multiple dates, such as a date 574 and a date 576. In one example, table header 572 represent a table header for an operating statement with date 574 heading a column for indicating cash flow "for the year ended "Dec. 31, 2015" and date 576 heading a column for indicating cash flow "for the year ended "Dec. 31, 2014". In one example, the combination of multiple dates, such as date 574 and date 576, within a table header, followed by operating cash indicated by dollar amounts 578 indicates that a document is most likely classified under the category of "financial statement" and the relevant embedded date for classifying the financial statement is the most recent date from among the two dates of "Dec. 31, 2015".

In one example, the financial transaction for the loan may also include one or more documents that do not include a date embedded in the content of the document. For example, the financial transaction for the loan includes a context model for documents that fall under the category of "other", as illustrated at 580, for documents that do not include a date.

Figure 6:
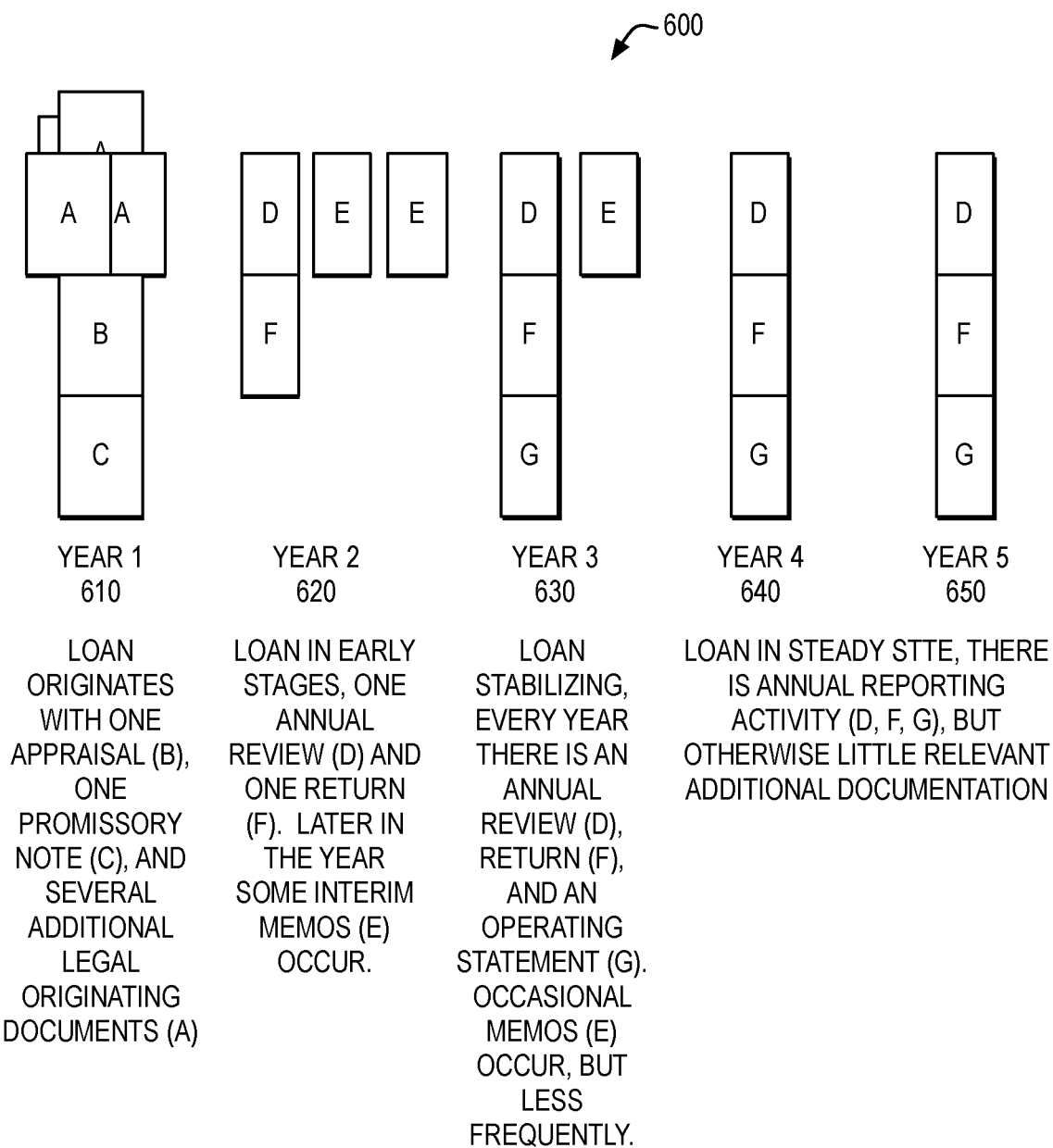
FIG. 6 illustrates a block diagram of one example of relative ages of different logical types of documents in a loan transaction.

FIG. 6 illustrates a block diagram of one example of relative ages of different logical types of documents in a loan transaction.

In one example, a timeline 600 illustrates an example of the relative ages of documents in a financial transaction by category reflecting temporal characteristics applied by date-based classifier 330. In one example, a first expected time window of "year 1" is illustrated at reference numeral 610, including three categories of documents, of a category A "originating documents", a category B "appraisal document", and a category C "promissory note". In one example, during "year 1", multiple documents of a logical type "originating documents" are expected, such as the documents with context classified as "originating document" illustrated at reference numeral 510 and illustrated at reference numeral 530. As illustrated in FIG. 6, during "year 1", the loan originates with one category B "appraisal document" and one category C "promissory note".

In one example, a second expected time window of a "year 2" is illustrated at reference numeral 620, including three categories of documents, of a category D "annual review", a category E "memos", and a category F "return". In one example, during "year 2", during the "early stage" of the loan, one category D "annual review" occurs with a category F "return", followed by multiple category E "memos" later in the year.

In one example, a third expected time window of a "year 3" is illustrated at reference numeral 630, including four categories of documents, of category D "annual review", category E "memos", category F "return", and category G "operating statement". In one example, during "year 3", during a stabilizing stage of the loan, one category D "annual review" occurs with a category F "return" and category G "operating system", along with one or more category E "memos" later in the year. In one example, fewer category E "memos" are expected during "year 3" than during "year 2".

In one example, a fourth expected time window of a "year 4" is illustrated at reference numeral 640 and a fifth expected time window of a "year 5" is illustrated at reference numeral 650, each including three categories of documents, of category D "annual review", category F "return", and category G "operating statement". In one example, during each of "year 4" and "year 5", the loan is in a stead state, with annual reporting of category D "annual review", category F "return", and category G "operating statement", but otherwise little other relevant documentation.

Figure 7:
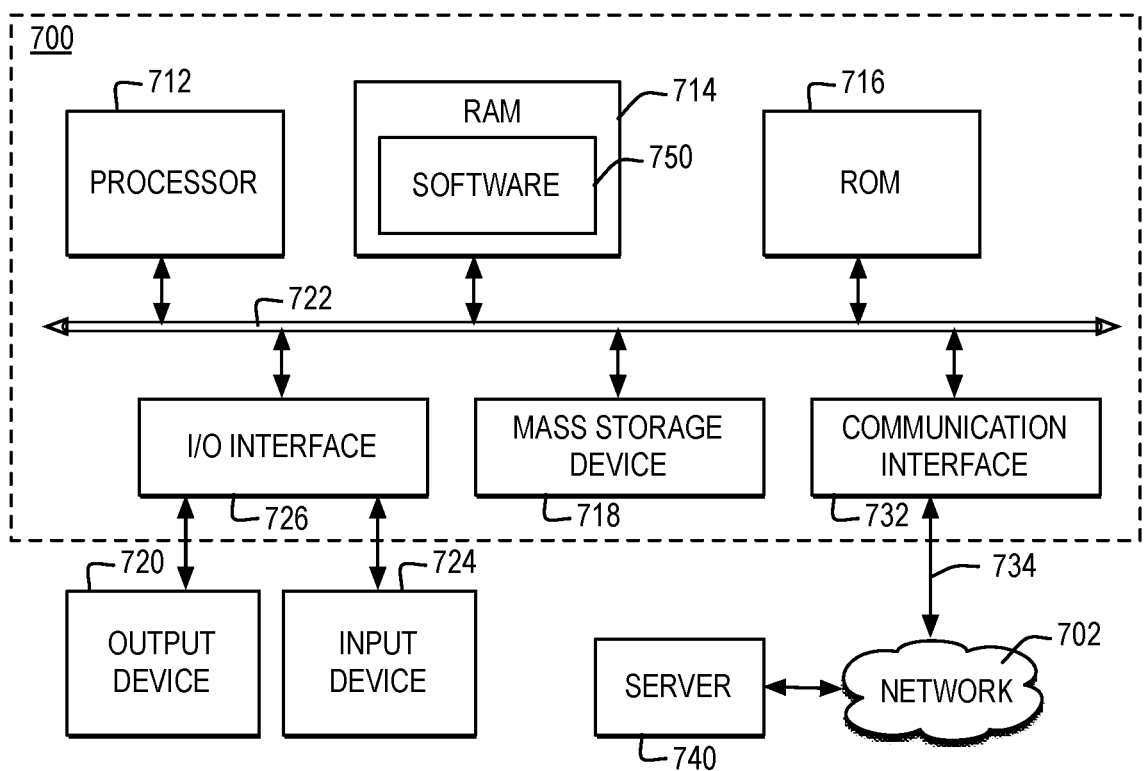
FIG. 7 illustrates a block diagram of one example of a computer system in which one embodiment of the invention is implemented.

FIG. 7 illustrates a block diagram of one example of a computer system in which one embodiment of the invention is implemented. An embodiment of the present invention is performed in a variety of systems and combinations of systems, made up of functional components, such as the functional components described with reference to a computer system 700 and communicatively connected to a network, such as network 702.

Computer system 700 includes a bus 722 or other communication device for communicating information within computer system 700, and at least one hardware processing device, such as processor 712, coupled to bus 722 for processing information. Bus 722 preferably includes low-latency and higher latency paths that are connected by bridges and adapters and controlled within computer system 700 by multiple bus controllers. According to one aspect, when implemented as a server or node, computer system 700 include multiple processors designed to improve network servicing power.

In one embodiment, processor 712 is at least one general-purpose processor that, during normal operation, processes data under the control of software 750, which includes at least one of application software, an operating system, middleware, and other code and computer executable programs accessible from a dynamic storage device such as random access memory (RAM) 714, a static storage device such as Read Only Memory (ROM) 716, a data storage device, such as mass storage device 718, or other data storage medium. According to one aspect, software 750 includes, but is not limited to, code, applications, protocols, interfaces, and processes for controlling one or more systems within a network including, but not limited to, an adapter, a switch, a server, a cluster system, and a grid environment.

In one embodiment, computer system 700 communicates with a remote computer, such as server 740, or a remote client. In one example, server 740 is connected to computer system 700 through any type of network, such as network 702, through a communication interface, such as network interface 732, or over a network link that may be connected, for example, to network 702.

In the example, multiple systems within a network environment are communicatively connected via network 702, which is the medium used to provide communications links between various devices and computer systems communicatively connected. According to one aspect, network 702 includes permanent connections such as wire or fiber optics cables and temporary connections made through telephone connections and wireless transmission connections, for example, and may include routers, switches, gateways and other hardware to enable a communication channel between the systems connected via network 702. According to one aspect, network 702 represents one or more of packet-switching based networks, telephony based networks, broadcast television networks, local area and wire area networks, public networks, and restricted networks.

In one embodiment, network 702 and the systems communicatively connected to computer 700 via network 702 implement one or more layers of one or more types of network protocol stacks which may include one or more of a physical layer, a link layer, a network layer, a transport layer, a presentation layer, and an application layer. For example, according to one aspect, network 702 implements one or more of the Transmission Control Protocol/Internet Protocol (TCP/IP) protocol stack or an Open Systems Interconnection (OSI) protocol stack. In addition, according to another aspect, network 702 represents the worldwide collection of networks and gateways that use the TCP/IP suite of protocols to communicate with one another. In one example, network 702 implements a secure HTTP protocol layer or other security protocol for securing communications between systems.

In the example, network interface 732 includes an adapter 734 for connecting computer system 700 to network 702 through a link and for communicatively connecting computer system 700 to server 740 or other computing systems via network 702. Although not depicted, network interface 732 may include additional software, such as device drivers, additional hardware and other controllers that enable communication. When implemented as a server, according to one aspect, computer system 700 includes multiple communication interfaces accessible via multiple peripheral component interconnect (PCI) bus bridges connected to an input/output controller, for example. In this manner, in one example, computer system 700 allows connections to multiple clients via multiple separate ports and each port also supports multiple connections to multiple clients.

Figure 8:
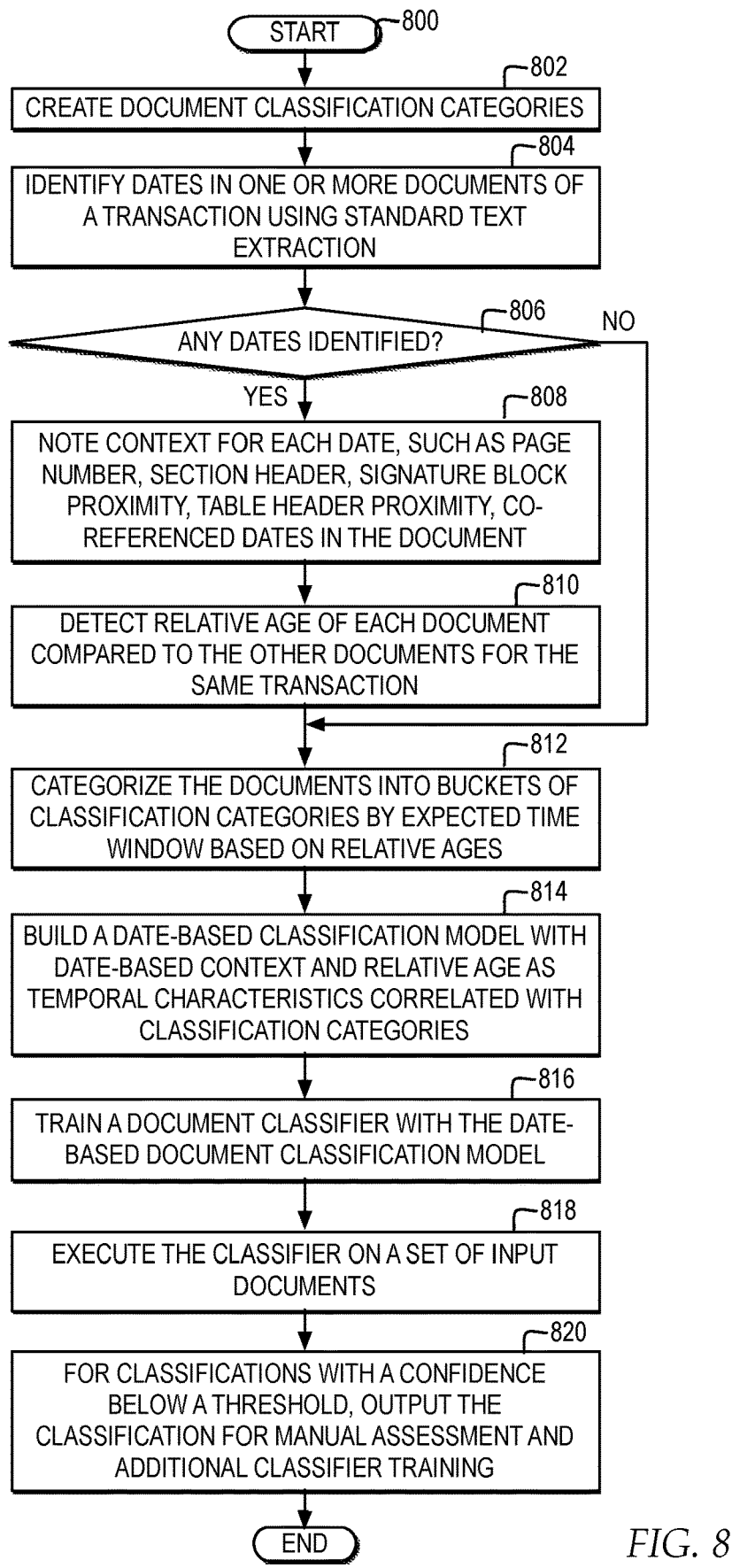
FIG. 8 illustrates a high level logic flowchart of a process and computer program for generating a date-based document classifier.
Figure 9:
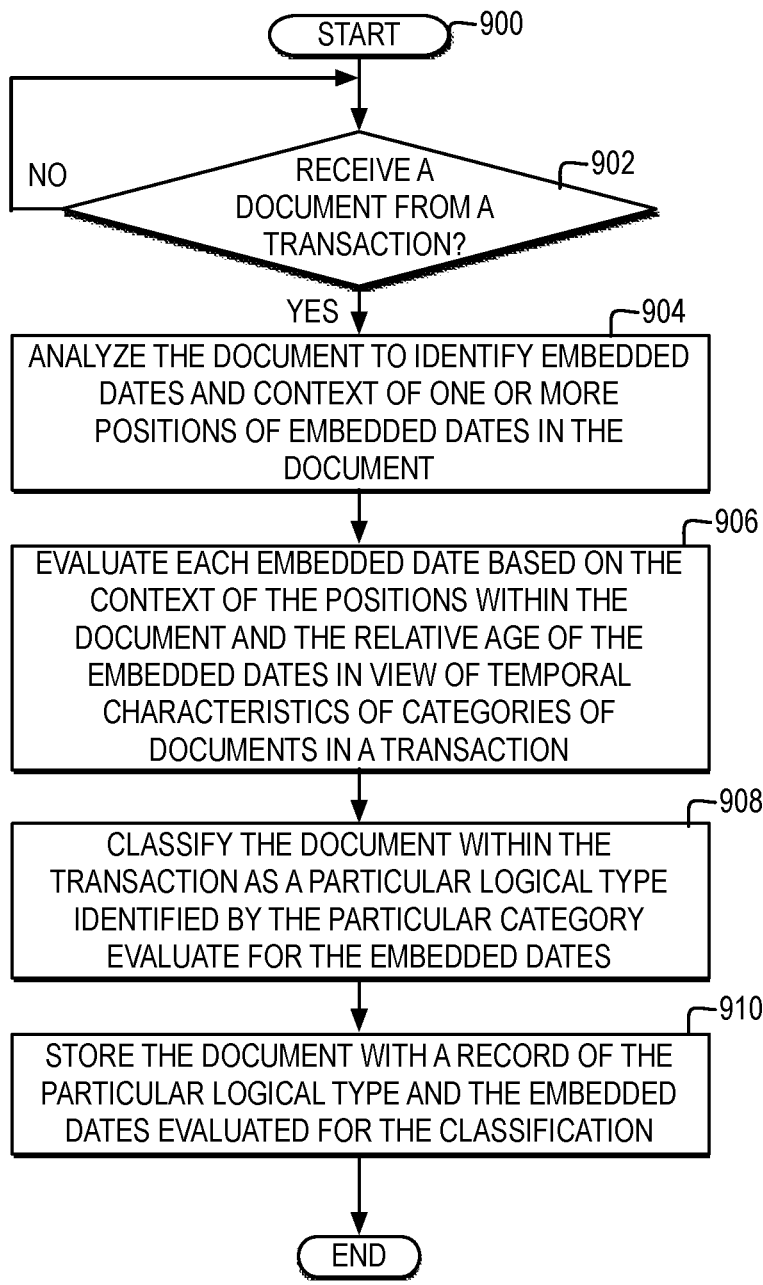
FIG. 9 illustrates a high level logic flowchart of a process and computer program for classifying a document in a multi-document transaction by applying a date-based document classifier.
Figure 10:
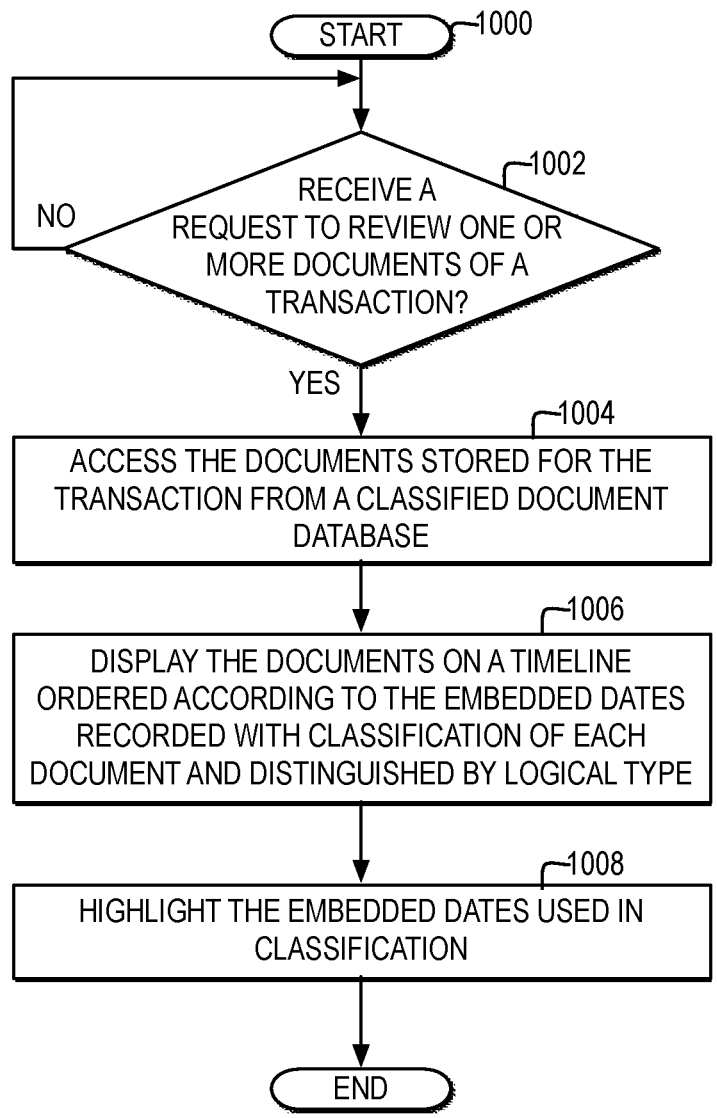
FIG. 10 illustrates a high level logic flowchart of a process and computer program for outputting results of a date-based classification of a multi-document transaction.

In one embodiment, the operations performed by processor 712 control the operations of flowchart of FIGS. 8-10 and other operations described herein. In one embodiment, operations performed by processor 712 are requested by software 750 or other code or the steps of one embodiment of the invention might be performed by specific hardware components that contain hardwired logic for performing the steps, or by any combination of programmed computer components and custom hardware components. In one embodiment, one or more components of computer system 700, or other components, integrated into one or more components of computer system 700, contains hardwired logic for performing the operations of flowcharts in FIGS. 8-10.

In addition, in one embodiment, computer system 700 includes multiple peripheral components that facilitate input and output. These peripheral components are connected to multiple controllers, adapters, and expansion slots, such as input/output (I/O) interface 726, coupled to one of the multiple levels of bus 722. For example, input device 724 includes, for example, a microphone, a video capture device, an image scanning system, a keyboard, a mouse, or other input peripheral device, communicatively enabled on bus 722 via I/O interface 726 controlling inputs. In addition, for example, output device 720 communicatively enabled on bus 722 via I/O interface 726 for controlling outputs includes, for example, one or more graphical display devices, audio speakers, and tactile detectable output interfaces, but may also include other output interfaces. In alternate embodiments of the present invention, additional or alternate input and output peripheral components may be added.

With respect to FIG. 7, one or more embodiments of the present invention include a system, a method, and/or a computer program product. In one embodiment, the computer program product includes a computer readable storage medium (or media) having computer readable program instructions thereon for causing a processor to carry out aspects of the present invention.

In one embodiment, the computer readable storage medium is a tangible device that can retain and store instructions for use by an instruction execution device. According to one aspect, the computer readable storage medium is, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (MD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

In one embodiment, computer readable program instructions described herein are downloaded to respective computing/processing devices from a computer readable storage medium or to an external computer or external storage device via a network, for example, the Internet, a local area network, a wide area network and/or a wireless network. According to one aspect, the network comprises copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

In one embodiment, computer readable program instructions for carrying out operations of the present invention include, but are not limited to, assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. According to one aspect, the computer readable program instructions execute entirely on the user's computer, partly on the user's computer, as a stand-alone software package, partly on the user's computer and partly on a remote computer or entirely on the remote computer or server. In the latter scenario, according to one aspect, the remote computer is connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Those of ordinary skill in the art will appreciate that the hardware depicted in FIG. 7 may vary. Furthermore, those of ordinary skill in the art will appreciate that the depicted example is not meant to imply architectural limitations with respect to the present invention.

FIG. 8 illustrates a high level logic flowchart of a process and computer program for generating a date-based document classifier.

In one example, the process and program start at block 800 and thereafter proceeds to block 802. Block 802 illustrates creating document classification categories for a transaction. Next, block 804 illustrates identifying one or more dates in one or more documents of a transaction using standard text extraction. Thereafter, block 806 illustrates determining whether any dates are identified in each document. At block 806, if no dates are identified in a particular document, then for that particular document the process passes to block 812. At block 806, if one or more dates are identified in one or more documents, then the process passes to block 808.

Block 808 illustrates noting the context for each date, such as a page number, section header, signature block proximity, table header proximity, and co-referenced dates in the document. Next, block 810 illustrates detecting the relative age of each document compared to other documents for the same transaction. Thereafter, block 812 illustrates categorizing the documents into buckets of classification categories by expected time window based on relative ages. Next, block 814 illustrates building a date-based classification model with date-based context and relative age of expected time windows on a timeline temporal characteristics correlated with classification categories. Thereafter, block 816 illustrates training a document classifier with the date-based document classification model. In one embodiment, the document classifier is an existing classifier for applying classification based on embedded context in addition to dates. Next, block 818 illustrates executing the classifier on a set of documents for a transaction. Thereafter, block 820 illustrates that for classifications returned by the classifier with a confidence below a threshold, outputting the classification for manual assessment, and additional classifier training, and the process ends.

FIG. 9 illustrates a high level logic flowchart of a process and computer program for classifying a document in a multi-document transaction by applying a date-based document classifier.

In one example, a process and computer program product start at block 900 and thereafter proceed to block 902. Block 902 illustrates a determination whether a document from a transaction is received. At block 902, if a document from a transaction is received, then the process passes to block 904. Block 904 illustrates analyzing the document to identify embedded dates and context of one or more positions of embedded dates in the document. Next, block 906 illustrates evaluating each embedded date based on the context of the positions within the document and the relative age of the embedded dates in view of temporal characteristics of categories of documents in a transaction. Thereafter, block 908 illustrates classifying the document within the transaction as a particular logical type identified by the particular category evaluated for the embedded dates. Next, block 910 illustrates storing the document with a record of the particular logical type and the embedded dates evaluated for the classification, and the process ends.

FIG. 10 illustrates a high level logic flowchart of a process and computer program for outputting results of a date-based classification of a multi-document transaction.

In one example, a process and computer program product start at block 1000 and thereafter proceed to block 1002. Block 1002 illustrates a determination whether a request is received to review one or more documents of a transaction. At block 1002, if a request is received to review one or more documents of a transaction, then the process passes to block 1004. Block 1004 illustrates accessing the documents stored for the transaction from a classified document database. Next, block 1006 illustrates displaying the documents on a timeline ordered according to the embedded dates recorded with classifications of each document and distinguished by logical type. Thereafter, block 1008 illustrates highlighting the embedded dates used in the classification, and the process ends.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, occur substantially concurrently, or the blocks may sometimes occur in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising", when used in this specification specify the presence of stated features, integers, steps, operations, elements, and/or components, but not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the one or more embodiments of the invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described to best explain the principles of the invention and the practical application, and to enable others of ordinary skill in the art to understand the invention for various embodiments with various modifications as are suited to the particular use contemplated.

The foregoing description is just an example of embodiments of the invention, and variations and substitutions. While the invention has been particularly shown and described with reference to one or more embodiments, it will be understood by those skilled in the art that various changes in form and detail may be made therein without departing from the spirit and scope of the invention.

What is claimed is:

1. A method comprising:
    categorizing, by a computer system, a plurality of documents in one or more transactions into a plurality of buckets each identified by a separate category of a plurality of categories for an expected time window based on a separate relative age of each of the plurality of documents evaluated from one or more dates identified in the plurality of documents;

training, by the computer system, a document classifier with a model of the separate relative age of each of the plurality of documents as a temporal characteristic correlated with the respective category of a respective bucket of the plurality of buckets; and executing, by the computer system, the document classifier on a plurality of input documents to classify each of the plurality of input documents as a particular logical type identified by a particular category from among a plurality of logical types.

2. The method according to claim 1, wherein categorizing, by the computer system, the plurality of documents in one or more transactions into the plurality of buckets each identified by the separate category of the plurality of categories for the expected time window based on the separate relative age of each of the plurality of documents evaluated from the one or more dates identified in the plurality of documents further comprises:

creating, by the computer system, the plurality of categories within the transaction;

identifying, by the computer system, the one or more dates in content of the plurality of documents using standard text extraction;

identifying, by the computer system, a separate context of one or more positions of each separate date of the one or more dates; and detecting, by the computer system, the separate relative age of each of a selection of the plurality of documents in a same transaction from among the one or more transactions.

3. The method according to claim 1, further comprising:

receiving, by the computer system, a digital scan of each of the plurality of documents;

converting, by the computer system, content of each of the plurality of documents in the digital scan from an image into text; and analyzing, by the computer system, the text to identify the one or more dates in the content of the document at one or more positions in the document.

4. The method according to claim 1, wherein training, by the computer system, the document classifier with the model of the separate relative age of each of the plurality of documents as the temporal characteristic correlated with the respective category of the respective bucket of the plurality of buckets further comprises:

building, by the computer system, the model with the separate relative age of each of the plurality of documents and a context of one or more positions of each of the one or more dates within each of the plurality of documents correlated with the respective category of the respective bucket of the plurality of buckets.

5. The method according to claim 4, wherein building, by the computer system, the model with the separate relative age of each of the plurality of documents and the context of the one or more positions of each of the one or more dates within each of the plurality of documents correlated with the respective category of the respective bucket of the plurality of buckets further comprises:

identifying, by the computer system, the context of each of the one or more positions within each of the plurality of documents in view of the one or more dates comprising a location relative to a signature line near the end of a plurality of pages of a particular document from among the plurality of documents.

6. The method according to claim 1, further comprising:

receiving, by the computer system, a separate confidence value of a plurality of confidence values of each classification of each of the plurality of input documents as the particular logical type from the document classifier; and responsive to a particular confidence value of the plurality of confidence values less than a threshold, outputting, by the computer system, a particular classification associated with the particular confidence value to a user interface.

7. The method according to claim 1, further comprising:

storing, by the computer system, the plurality of input documents in a database with a record specifying a respective logical type from the classifier and a respective date;

receiving, by the computer system, a request to review a particular transaction;

accessing, by the computer system, a selection of documents for the particular transaction from among the plurality of input documents stored in the database with the respective logical type from the classifier and the respective date; and graphically displaying, by the computer system, the selection of documents on a timeline ordered according to a selection of dates of the respective date recorded with the respective logical type of each document in the selection of documents and distinguished by the respective logical type.

8. A computer system comprising one or more processors, one or more computer-readable memories, one or more computer-readable storage devices, and program instructions, stored on at least one of the one or more storage devices for execution by at least one of the one or more processors via at least one of the one or more memories, the stored program instructions comprising:

program instructions to categorize a plurality of documents in one or more transactions into a plurality of buckets each identified by a separate category of a plurality of categories for an expected time window based on a separate relative age of each of the plurality of documents evaluated from one or more dates identified in the plurality of documents;

program instructions to train a document classifier with a model of the separate relative age of each of the plurality of documents as a temporal characteristic correlated with the respective category of a respective bucket of the plurality of buckets; and program instructions to execute the document classifier on a plurality of input documents to classify each of the plurality of input documents as a particular logical type identified by a particular category from among a plurality of logical types.

9. The computer system according to claim 8, wherein the program instructions to categorize the plurality of documents in one or more transactions into the plurality of buckets each identified by the separate category of the plurality of categories for the expected time window based on the separate relative age of each of the plurality of documents evaluated from the one or more dates identified in the plurality of documents further comprise:

program instructions to create the plurality of categories within the transaction;

program instructions to identify the one or more dates in content of the plurality of documents using standard text extraction;
program instructions to identify a separate context of one or more positions of each separate date of the one or more dates; and
program instructions to detect the separate relative age of each of a selection of the plurality of documents in a same transaction from among the one or more transactions.

10. The computer system according to claim 8, the stored program instructions further comprising:
program instructions to receive a digital scan of each of the plurality of documents;
program instructions to convert content of each of the plurality of documents in the digital scan from an image into text; and
program instructions to analyze the text to identify the one or more dates in the content of the document at one or more positions in the document.

11. The computer system according to claim 8, wherein the program instructions to train the document classifier with the model of the separate relative age of each of the plurality of documents as the temporal characteristic correlated with the respective category of the respective bucket of the plurality of buckets further comprise:
program instructions to build the model with the separate relative age of each of the plurality of documents and a context of one or more positions of each of the one or more dates within each of the plurality of documents correlated with the respective category of the respective bucket of the plurality of buckets.

12. The computer system according to claim 11, wherein the program instructions to build the model with the separate relative age of each of the plurality of documents and the context of the one or more positions of each of the one or more dates within each of the plurality of documents correlated with the respective category of the respective bucket of the plurality of buckets further comprise:
program instructions to identify the context of each of the one or more positions within each of the plurality of documents in view of the one or more dates comprising a location relative to a signature line near the end of a plurality of pages of a particular document from among the plurality of documents.

13. The computer system according to claim 8, the stored program instructions further comprising:
program instructions to receive a separate confidence value of a plurality of confidence values of each classification of each of the plurality of input documents as the particular logical type from the document classifier; and
program instructions, responsive to a particular confidence value of the plurality of confidence values less than a threshold, to output a particular classification associated with the particular confidence value to a user interface.

14. The computer system according to claim 8, the stored program instructions further comprising:
program instructions to store the plurality of input documents in a database with a record specifying a respective logical type from the classifier and a respective date;
program instructions to receive a request to review a particular transaction;
program instructions to access a selection of documents for the particular transaction from among the plurality of input documents stored in the database with the respective logical type from the classifier and the respective date; and
program instructions to graphically display the selection of documents on a timeline ordered according to a selection of dates of the respective date recorded with the respective logical type of each document in the selection of documents and distinguished by the respective logical type.

15. A computer program product comprises a computer readable storage medium having program instructions embodied therewith, wherein the computer readable storage medium is not a transitory signal per se, the program instructions executable by a computer to cause the computer to:
categorize, by the computer, a plurality of documents in one or more transactions into a plurality of buckets each identified by a separate category of a plurality of categories for an expected time window based on a separate relative age of each of the plurality of documents evaluated from one or more dates identified in the plurality of documents;
train, by the computer, a document classifier with a model of the separate relative age of each of the plurality of documents as a temporal characteristic correlated with the respective category of a respective bucket of the plurality of buckets; and
execute, by the computer, the document classifier on a plurality of input documents to classify each of the plurality of input documents as a particular logical type identified by a particular category from among a plurality of logical types.

16. The computer program product according to claim 15, further comprising the program instructions executable by a computer to cause the computer to:
create, by the computer, the plurality of categories within the transaction;
identify, by the computer, the one or more dates in content of the plurality of documents using standard text extraction;
identify, by the computer, a separate context of one or more positions of each separate date of the one or more dates; and
detect, by the computer, the separate relative age of each of a selection of the plurality of documents in a same transaction from among the one or more transactions.

17. The computer program product according to claim 15, further comprising the program instructions executable by a computer to cause the computer to:
receive, by the computer, a digital scan of each of the plurality of documents;
convert, by the computer, content of each of the plurality of documents in the digital scan from an image into text; and
analyze, by the computer, the text to identify the one or more dates in the content of the document at one or more positions in the document.

18. The computer program product according to claim 15, further comprising the program instructions executable by a computer to cause the computer to:
build, by the computer, the model with the separate relative age of each of the plurality of documents and a context of one or more positions of each of the one or more dates within each of the plurality of documents correlated with the respective category of the respective bucket of the plurality of buckets.

19. The computer program product according to claim 18, further comprising the program instructions executable by a computer to cause the computer to:
- identify, by the computer, the context of each of the one or more positions within each of the plurality of documents in view of the one or more dates comprising a location relative to a signature line near the end of a plurality of pages of a particular document from among the plurality of documents.

20. The computer program product according to claim 15, further comprising the program instructions executable by a computer to cause the computer to:
- receive, by the computer, a separate confidence value of a plurality of confidence values of each classification of each of the plurality of input documents as the particular logical type from the document classifier; and
- responsive to a particular confidence value of the plurality of confidence values less than a threshold, output, by the computer, a particular classification associated with the particular confidence value to a user interface.

* * * * *